United States Patent
Cotteverte et al.

(10) Patent No.: US 6,674,773 B1
(45) Date of Patent: Jan. 6, 2004

(54) MULTI-WAVELENGTH RAMAN LASER

(75) Inventors: Jean-Charles J. C. Cotteverte, Montreal (CA); Bruno Desruelle, Paris (FR); Stefan M. Hess, Fountainebleau (FR); Nicholas J. Traynor, Fountainebleau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/283,389

(22) Filed: Oct. 29, 2002

(30) Foreign Application Priority Data

Dec. 10, 2001 (EP) .............................. 01403213

(51) Int. Cl.[7] .................................... H01S 3/30
(52) U.S. Cl. ................................. 372/6; 372/3
(58) Field of Search ................. 372/6.3, 94, 99, 372/21, 22, 70, 71, 72

(56) References Cited

U.S. PATENT DOCUMENTS

| | | | | |
|---|---|---|---|---|
| 4,685,107 A | * | 8/1987 | Kafka et al. | 372/6 |
| 5,623,508 A | * | 4/1997 | Grubb et al. | 372/3 |
| 6,163,396 A | * | 12/2000 | Webb | 359/332 |
| 6,163,554 A | | 12/2000 | Chang et al. | 375/6 |
| 6,289,027 B1 | | 9/2001 | Lawrence et al. | 372/6 |
| 6,304,368 B1 | * | 10/2001 | Hansen et al. | 359/334 |
| 6,539,148 B1 | * | 3/2003 | Kim et al. | 385/27 |
| 6,567,430 B1 | * | 5/2003 | Islam et al. | 372/3 |

FOREIGN PATENT DOCUMENTS

WO    WO 9956360 A    11/1999

OTHER PUBLICATIONS

"Multiwavelength erbium–doped fiber ring lasers with overlap–written fiber Bragg gratings," Wei, et al, Optics Letters, vol. 25, No. 16, Aug. 15, 2000.

"Room Temperature Multifrequency Erbium–Doped Fiber Laser Anchored on the ITU Frequency Grid," Bellemare, et al, Journal of Lightwave Technology, vol. 18, No. 6, Jun. 2000.

"Sinc–Sampled Fiber Bragg Gratings for Identical Multiple Wavelength Operation," Ibsen, et al, IEEE Photonics Technology Letters, vol. 10, No. 6, Jun. 1998.

"Fabrication of multipassband moire resonators in fibers by the dual–phase–mask exposure method," Everall, et al Optics Letters vol. 22, No. 19, Oct. 1, 1997.

(List continued on next page.)

Primary Examiner—Paul Ip
Assistant Examiner—Dung Nguyen
(74) Attorney, Agent, or Firm—Juliana Agon

(57) ABSTRACT

A multi-wavelength Raman laser comprising a Raman fiber forming part of an optical ring, preferably most parts of which are formed by optical fiber. The ring includes a periodic filter selectively transmitting optical power at a number of equally spaced wavelengths corresponding to the wavelengths of the laser output. Radiation at the signal wavelengths propagating in one direction on the ring is tapped onto an output fiber. An optical isolator is formed either in the ring or fiber tapped into the ring to suppress radiation propagating in the reverse direction on the ring. A frequency shifter may be inserted into the loop to prevent power from concentrating in a single mode, thereby allowing wide band lasing. A band pass filter may be inserted into the loop to restrict the lasing band.

20 Claims, 3 Drawing Sheets

OTHER PUBLICATIONS

"Dual-wavelength cascaded Raman Fibre laser," Chang, et al Electronics Letters, vol. 36, No. 16, Aug. 3, 2000.

"Multi-wavelength, continuous wave fibre Raman Ring Laser operating at 1.55 & micro;m," De Matos, et al Electronics Letters, vol. 37, No. 13, Jun. 21, 2001.

"Wavelength tunable CR Raman fibre ring laser operating at 1486–1551 nm," Reeves–Hall, et al, Electronics Letters, Apr. 12, 2001.

"Low-Threshold Sychronously Pumped All-Fiber Ring Raman Laser," Desurvire, et al, Journal of Lightwave Technology, vol. Lt–5, No. 1, 1987.

* cited by examiner

MULTI-WAVELENGTH RAMAN LASER

CROSS REFERENCE TO RALTED APPLICATION

This application claims the benefit of European Application No. 01403213.0 Filed Dec. 10, 2001.

BACKGROUND OF THE INVENTION

1. Field of the Invention

The invention relates generally to fiber lasers. In particular, the invention relates to multi-wavelength fiber lasers.

2. Background Art

Many advanced communication system rely upon wavelength division multiplexing (WDM) over an optical fiber communication link or network. An optical fiber has a very large transmission bandwidth in specific windows. For silica fibers, these windows are near 850 nm, 1310 nm, and 1550 nm. In a WDM system, respective data signals are impressed upon multiple optical carriers of specific and different wavelengths, and all the modulated carriers are coupled into the same optical fiber. The number of channels in a dense WDM system may be very large, for example, 40 channels spaced by 100 GHz in frequency, which is about 0.8 nm in wavelength for a 1550 nm signal wavelength. The technology for fabricating the various components of such a WDM communication system is well in hand.

However, during development or fabrication, these components need to be tested over their usable wavelength band. This testing has presented a problem because of the large number of discrete channels. The conventional approach mimics a WDM transmitter in which a plurality of distributed feedback (DFB) lasers are fabricated each having an emission wavelength corresponding to one of the wavelengths of the ITU grid defining the WDM wavelengths. While the separate DFB lasers can be individually modulated, much of the testing does not require data modulation. For many tests, a flat and unmodulated spectrum of channels is sufficient to test system for channel response. Additionally, forty or more DFB lasers present a significant cost for one piece of laboratory equipment.

Several suggestions have been made for a multi-wavelength laser source based on a ring laser incorporating an erbium-doped fiber amplifier (EDFA) and various types of gratings to define the wavelength spectrum of the lasing light signals. The EDFA provides optical gain based upon long lived electronic energy levels of a rare-earth ion such as erbium doped into the fiber. However, the energy levels are discrete and narrow, thereby resulting in a non-flat gain spectrum and often necessitating multiple pump wavelengths.

SUMMARY OF THE INVENTION

The invention includes a multi-wavelength Raman fiber laser in which a Raman fiber is incorporated into an optical ring. A periodic filter is placed on the ring to define the lasing wavelengths. Optical pump power is coupled into the ring, and Raman amplified light is coupled out of the ring. An optical isolator allows lasing in only one direction of the ring and is preferably coordinated with the directions of the couplers for pump power and output signals.

A bandpass filter may be needed to define the limits of the amplification and filtered band.

A frequency shifter may be needed to prevent amplification from being concentrated in only one or two wavelengths by breaking the normal mode structure and preventing competition between modes. The frequency shift may be equal to spacings of the periodic filter or may be substantially less so that several round trips occur before an adjacent channel is encountered. An acousto-optical modulator may serve as the frequency shifter.

The output coupler may be a wavelength division multiplexer selectively coupling out only selected wavelengths. Alternatively, the output coupler may be less selective to frequency but a fiber Bragg grating may be written onto the output fiber to reflect the pump wavelength while passing the amplified wavelengths.

DETAILED DESCRIPTION OF THE PREFERRED EMBODIMENTS

Figure 1:
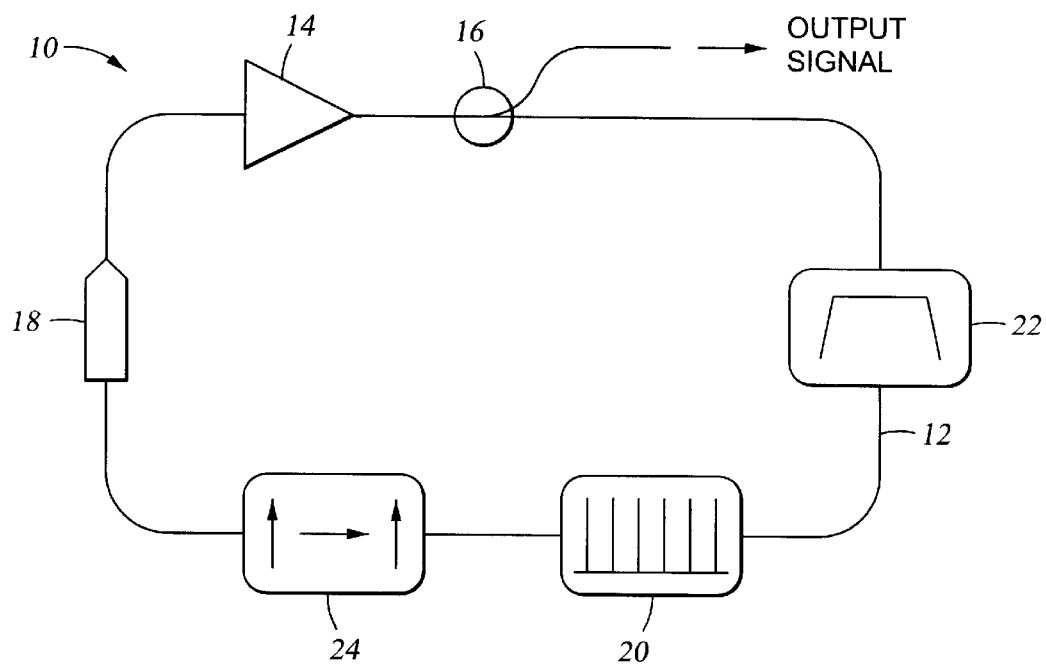
FIG. 1 is a schematic and functional diagram of an embodiment a multi-wavelength fiber Raman laser of the invention.

One embodiment of the invention is a multi-wavelength laser source 10 schematically illustrated in FIG. 1. It is formed as a ring laser, preferably implemented mostly on a fiber ring 12. The fiber 12, at least between active components, may be single-mode silica fiber commercially available for the communication industry. The laser source 10 includes a discrete Raman optical amplifier 14. Although it is possible for the Raman fiber to be used as the transmission fiber in the loop, Raman fiber is a non-standard part, so it is preferred that a separate coil of Raman fiber be identified with a discrete amplifier. Optical power is removed from the ring by a tap coupler 16, which, as described later, may incorporate some wavelength filtering. The output coupling coefficient of the tap coupler is typically about 10%, but it may be optimized to maximize output power and depends on the configuration of the ring cavity.

An optical isolator 18 is placed in the ring to preferentially pass light in the direction in which power is coupled from the ring, in the clockwise direction as illustrated. The isolator 18 prevents lasing in both directions on the ring.

A periodic filter 20 placed in the ring is characterized by a spectrum having a plurality of wavelength pass bands which define the plural lasing wavelengths. Typically, the periodic filter is fabricated as a unitary element in which a large number of passbands, for example, greater than five, are separated by a fixed wavelength spacing. A separate bandpass filter 22 may be placed in the ring to define the bandwidth range over which the desired lasing wavelengths are included. Further, if the one or more pump wavelengths are placed outside the pass band of the bandpass filter 22, the need for a pump reflector is reduced, and it may be eliminated. The separate bandpass filter 22 is particularly needed if the periodic filter 20 has a spectrum extending far outside the desired range. A gain flattening filter may be included in the ring or incorporated into the bandpass filter 22 to achieve a spectrally flat output power spectrum.

A frequency shifter 24 may need to be placed in the ring cavity to prevent mode competition between standing waves by interchanging power between the modes being amplified. It is possible to design the frequency shift to equal the wavelength spacing of the periodic filter so that power is coupled between the filtered modes, thereby preventing any one or two wavelength modes from dominating. Alternatively and more typically, the frequency shift may be much smaller, on the order of 100 MHz, so that several round trips around the loop are required before a neighboring mode is encountered. The frequency shifting breaks down the normal mode structure associated with the laser and inhibits the competition otherwise existing between the modes. If the Raman amplifier 14 exhibits a homogeneous gain compression, the spectral behavior of the laser is difficult to control because of the mode competition in the steady-state regime. Under these conditions, the frequency shifter 24 prevents the growth of standing waves so that there is no mode competition and broad band lasing is possible. On the other hand, if the Raman amplifier 14 exhibits inhomogeneous gain compression, mode competition is much less of a problem so that the frequency shifter 24 may not be needed. A typical implementation for the frequency shifter 24 is an acousto-optical filter or modulator having a pair of interdigitated electrodes formed over and along an optical waveguide formed in a piezoelectric material. The frequency of the RF electrical signal applied across the electrodes determines the shift in the optical frequency. Most frequency shifters produce two signals shifted respectively up and down, but this dual shifting is not necessary for the desired effect.

Figure 2:
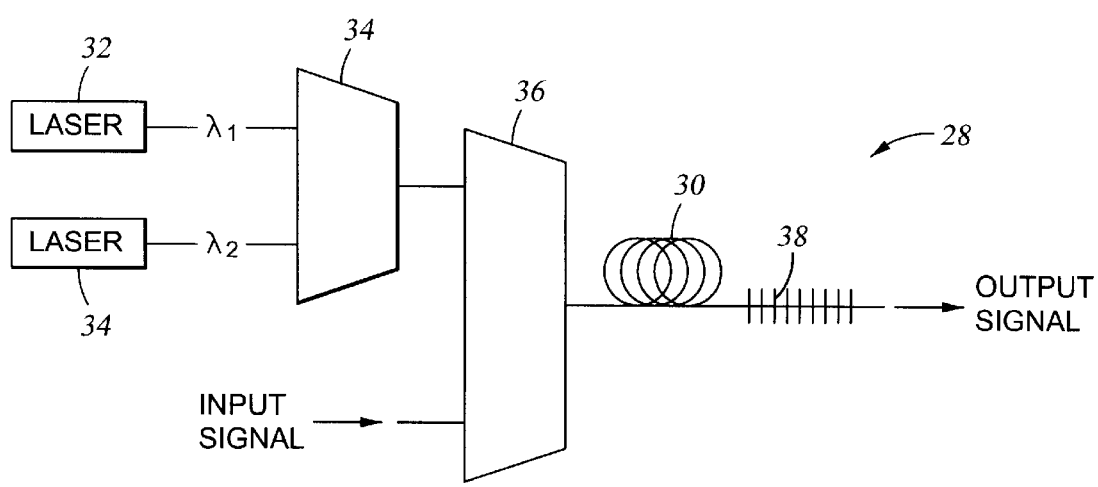
FIG. 2 is a schematic diagram of one embodiment of a first-order Stokes Raman amplifier.

The discrete Raman amplifier 14 is preferably implemented, as illustrated in the schematic diagram of FIG. 2, by a Raman amplifier 28 incorporating a Raman fiber 30. Raman fiber is well known and may be standard single-mode silica fiber, preferably designed to support small optical modes to increase the optical power density. The silica fiber can advantageously be doped with germanium or other materials to increase the cross section for stimulated Raman scattering, that is, to enhance the density of states of the phonons. Raman amplification involves the interaction of optical and phonon modes in the fiber. A Stokes process involves a pump photon being annihilated to create a phonon and another photon of slightly lower energy than the pump photon. An anti-Stokes process combines a pump photon and a phonon to create another photon of slightly higher energy. The phonon density spectrum is important even for the Stokes process because the probability of creating a photon at a particular energy depends on the density of allowed states at that energy, including phonon states. However, the cross section or probability for the anti-Stokes process is about 100 times lower than for a Stokes process. An advantage of Raman amplification over amplification based on rare-earth dopants is its relatively broad and flat gain spectrum, which is determined by the phonon density of states in the fiber.

The Raman amplifier 28 requires an optical pump signal. The design described here is based on wavelengths for a WDM communications network chosen within the wavelength range of 1530 to 1560 nm to match the gain spectrum of an erbium-doped fiber amplifier used as a broad-band amplifier in the network. However, the invention is not limited to these wavelengths. In order to achieve lasing in the 1530–1560 nm range, the pump wavelength may be in the range of 1400 to 1500 nm. In the embodiment of FIG. 2, two pump lasers 32, 34 at emission wavelengths $\lambda_1$ and $\lambda_2$ are used to flatten the spectrum of output power, and the relative powers of the two pump signals may be adjusted to further flatten the spectrum. The pump lasers 32, 34 at the desired wavelengths are well known. They may be fiber or semiconductor lasers stabilized by Bragg gratings written either onto the chip or onto external fiber. Other types of lasers may also be used.

The laser outputs are combined in a pump optical multiplexer 34, and the multi-wavelength pump signal is combined with an input signal on the fiber ring in a pump-signal optical multiplexer 36. Each of the multiplexers 34, 36 may be a respective Y-coupler formed by partially fusing together two fibers.

The optically pumped Raman fiber 30 amplifies the multi-wavelength signal input to it. A fiber Bragg grating 38 may be written into a fiber downstream of the Raman fiber 30 to reflect the one or more pump wavelengths. If there are multiple pump wavelengths, multiple Bragg gratings of different spacings may be written into the fiber. Depending on the overall design, the fiber Bragg grating 38 may be written onto a continuation of the Raman fiber 30 or onto another fiber spliced to it. The fiber Bragg grating 38, however, passes the multi-wavelength output signal and couples it into the fiber ring.

Returning to the functional block diagram of FIG. 1, the tap coupler 16 may be a Y-coupler of two fused fibers constructed to pass a fraction of the ring power to the output port external to the ring.

The filters 20, 22 may be implemented in several different ways. The bandpass filter 22 may be a dielectric passband filter of multiple layers of two dielectric materials differing in refractive index interposed between opposed facets of two optical fibers forming part of the ring fiber 12. The periodic filter 20 may be a dielectric Fabry-Perot transmission filter, for example, having partially reflective Bragg gratings written on the fiber 12 with a long cavity between them such that a large number of high-order modes correspond to the multiple frequencies in the desired passband. The periodic filter may alternatively be implemented by multiple Bragg gratings of different periodicities overlap-written into the fiber. A moire Bragg filter may be implemented by writing a complex Bragg grating into a fiber, that is, one having a complex structure of lines written into the fiber. One example of a moire Bragg pattern is a chirped Bragg pattern, that is, of a spacing that is slowly varying, that is written twice with one pattern stretched relative to the other.

Figure 3:
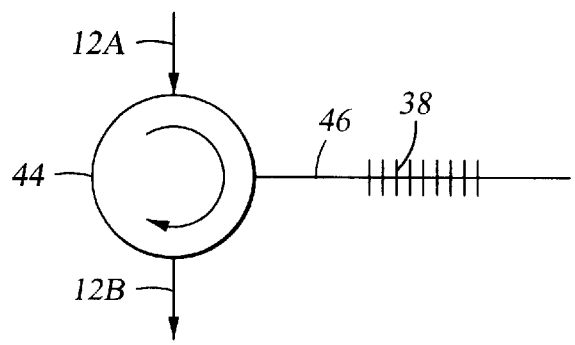
FIG. 3 is a schematic diagram of transmissive filter using a reflective grating.

The periodic and bandpass filters 20, 22 may be implemented in a combined structure, such as the reflective structure illustrated in FIG. 3. An optical circulator 44 has two of its ports connected to an ring input section 12A and a ring output section 12B of the ring fiber 12. A filter fiber 46 is connected to a third port such an optical input signal received from the ring input section 12A is coupled as an input to the filter fiber 46, and an optical output signal received from the filter fiber 46 is coupled to the ring output section 12B. A fiber Bragg grating 48 is written onto the filter fiber 46 to reflect at the multiple desired lasing wavelengths. Multiple Bragg gratings may be written onto the same or different portions of the filter fiber 46. More advantageously, a sinc-sampled Bragg grating can be written into the fiber according to a sinc-shaped sampling function where z is a sampling variable between 0 and 1 representing the distance along the length of the fiber, N is the number of periods, $L_{GR}$ is the length of the entire grating, and P is the period of the index modulation maxima. Such a sinc-shaped Bragg grating with a nearly analog value of refractive index can be fabricated by writing onto the fiber multiple gratings dephased from one another. This technique has been demonstrated for a 10 cm-long grating producing 16 sharp reflection peaks spaced by 100 GHz around 1560 nm with low reflectivity outside the band.

Figure 4:
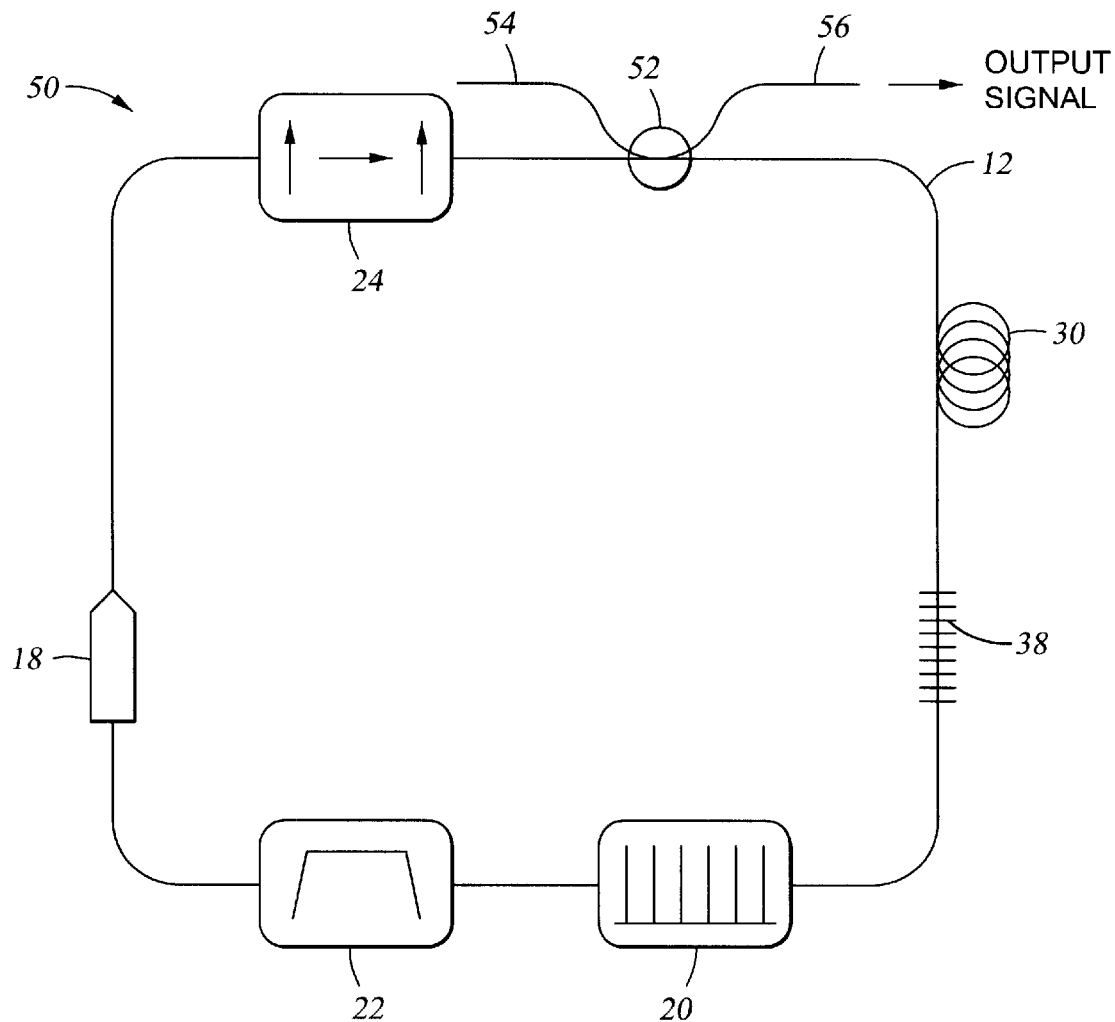
FIG. 4 is a schematic and more detailed diagram of first embodiment of the multi-wavelength Raman laser of FIG. 1.
Figure 5:
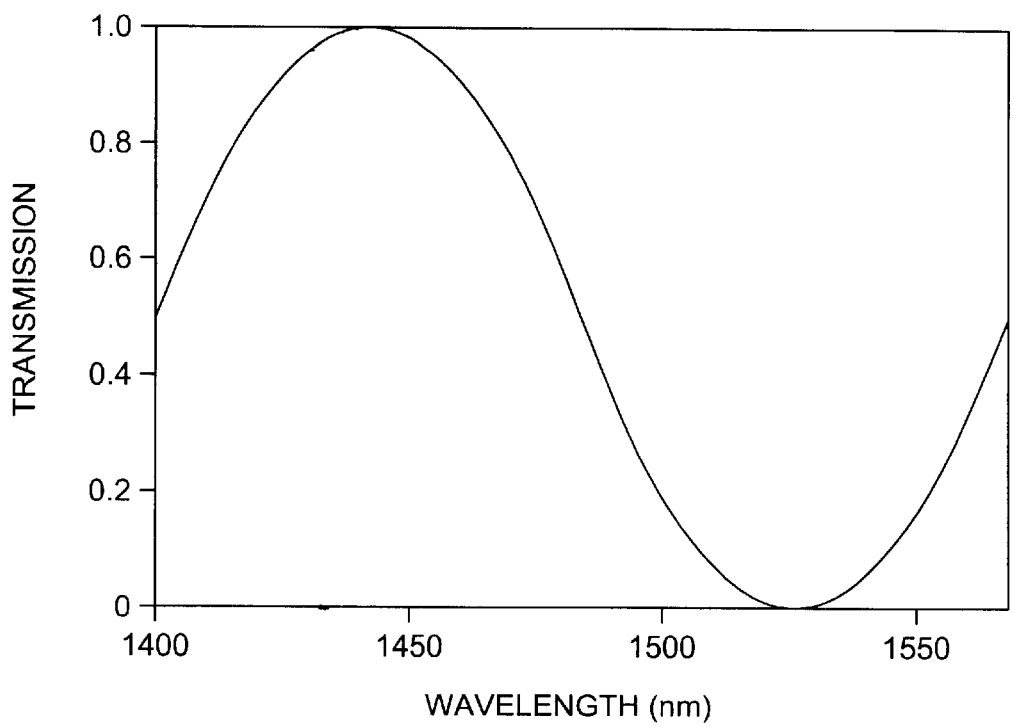
FIG. 5 is a spectrum of the transmission coefficient of a wavelength division multiplexer.

A schematic diagram of a multi-wavelength Raman fiber laser 30 is illustrated in FIG. 4. It includes the Raman fiber 30 and the fiber Bragg grating 38 reflective at the pump wavelengths downstream of the Raman fiber 30 and written into the ring fiber 12. It also includes the periodic filter 20, the bandpass filter 22, the isolator 18, and the frequency shifter 24. Additionally, a wavelength division multiplexer (WDM) 52 is interposed on the ring fiber, preferably immediately upstream from the Raman fiber 30. A WDM, also called a WDM optical coupler, is a well known optical component, typically implemented by partially fusing together two fibers along a predetermined length to produce a sinusoidal coupling coefficient between them, such as the transmission coefficient illustrated in the graph of FIG. 5 for transmission between a pump section 54 of the external fiber and the ring fiber 12 on the side of the WDM 52 upstream from the Raman fiber 30. A similar transmission coefficient is obtained from the ring fiber 12 on the side of the WDM 52 away from the Raman fiber 30 and the output section 56 of the external fiber. The transmission coefficients between the ends of the same fiber are the complements of the illustrated coefficients. The effect is to couple almost all of the pump radiation onto the ring fiber 12 and very little onto the output section 56 of the external fiber. In the desired lasing range of 1530–1560 nm, the transmission coefficient from the ring fiber 12 to the output section 56 of the external fiber is between 10% and 60%, which is adequate for a ring laser of significant gain per round trip. The optimum value of the output coupler will be determined by the overall cavity loss and available pump power. This transmission spectrum of FIG. 5 also means that whatever pump radiation is circulating clockwise in the ring through the WDM 52 is preferentially coupled into the output section 56 of the external fiber. This pump radiation needs to be either suppressed before it enters the WDM 52 or reflected back into the ring.

Figure 6:
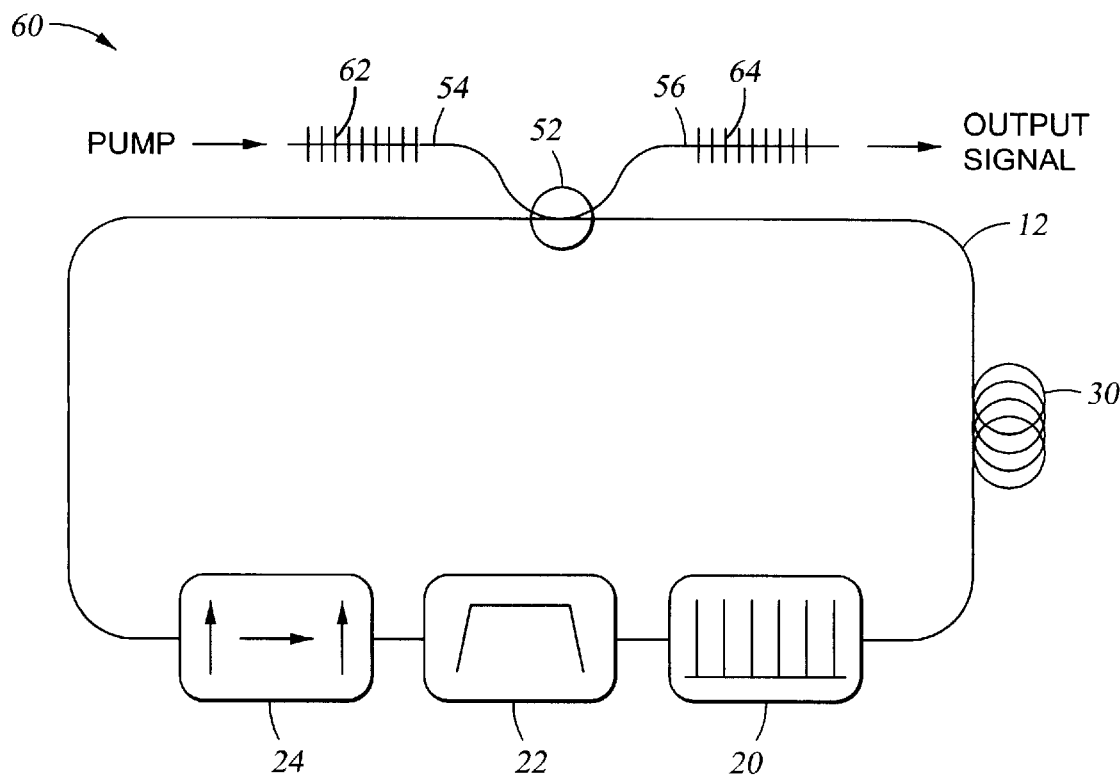
FIG. 6 is a schematic and more detailed diagram of a second embodiment of the multi-wavelength Raman laser of FIG. 1.

Another multi-wavelength Raman fiber laser 60 illustrated in the schematic diagram of FIG. 6 includes the previously described elements except for the optical isolator. Instead, a fiber Bragg grating 62 is written into the pump section 54 of the external fiber to be reflective at the signal wavelengths. Its grating pattern may correspond to the sinc-shaped spectrum described for the grating 48 of FIG. 3. However, the sharp peaks of the periodic filter are not needed, and a broad reflection peak including all the desired lasing wavelengths will be sufficient since a periodic filter is already installed in the cavity. The signal Bragg grating 62 converts a signal wavelength propagating counter-clockwise on the ring into a clockwise propagating one and therefore prevents power from being lost to the input side of the pump section 54.

Optionally in this embodiment as well as in the embodiment of FIG. 4, the fiber Bragg grating 38 previously located in the ring is replaced by a fiber Bragg grating 64 placed into the output section 56 of the external fiber to be reflective at the pump wavelength. If more than one pump wavelength is used, multiple Bragg gratings of different line spacings may be required. Since the pump grating 64 reflects power back into the loop in the opposite direction, an isolator should not be included in the loop. This placement of the pump reflector has the added advantage of suppressing the residual transmission of pump signal from the pump section 54 to the output section 56 of the external fiber. This suppression is particularly important if the optical coupler 52 is a wavelength division multiplexer that discriminates against the signal wavelengths in favor of the pump wavelengths.

A somewhat similar configuration can be used to form a cascaded Raman laser instead of the heretofore described Raman laser relying only upon first-order Stokes conversion. A cascaded Raman amplifier includes an optical cavity formed around the Raman amplifier that traps lower-order Stokes modes. One design for a cascaded Raman laser adds to the fiber pump section 54 the input Bragg grating 62 of FIG. 6 that is reflective at the wavelength of the first-order Stokes radiation to the arrangement of FIG. 4. However, the loop Bragg grating 38 is reflective at both the primary pump wavelength and at the wavelength of the first-order Stokes radiation. As a result, the first-order Stokes radiation trapped between the two gratings 62, 38 optically pumps the second-order Stokes radiation in the Raman fiber 30 positioned between them. The concept can be applied to yet higher-order modes by including reflectors at the ends of the cavity for all the trapped lower-order modes.

Although the multi-wavelength Raman laser of the invention is particularly useful for testing and development of WDM networks and components, its use is not so limited. Its output can be used as the multi-wavelength WDM optical source in conjunction with a multi-channel modulator. One possible modulator is an array waveguide grating integrated with an array of semiconductor optical amplifiers.

The invention thus provides a broadband source of laser radiation at a cost considerably less than that of a set of discrete semiconductor lasers.

What is claimed is:

1. A multi-wavelength Raman laser, comprising:
   an optical ring laser cavity having an optical ring fiber with its two ends coupled nearby in an optical fiber ring;
   a Raman fiber disposed in said optical ring, the Raman fiber having multiple modes over a pumping wavelength to a plurality of signal wavelengths;
   an optical coupler disposed between the two ends of the optical ring fiber, the coupler having at least a first optical coupler port and a second optical coupler port;
   the first optical coupler port facilitating the feedback cavity coupling of optical pump power with a plurality of filtered optical signals for pumping the Raman fiber at the pumping wavelength into said ring to obtain the plurality of optical signals wherein gain is provided by Raman amplification over at least one Stokes order corresponding to the pumping wavelength in response to a Raman interaction of the optical pump power and a phonon spectrum of the Raman fiber;
   a periodic filter disposed in said ring, the periodic filter having a filter spectrum placed approximately at the at least one Stokes order, the filter spectrum including a plurality of signal wavelength pass bands separated by a fixed wavelength spacing, the periodic filter preferentially passing the plurality of optical signals to filter out the plurality of filtered optical signals having the plurality of signal wavelengths with fixed spacings therebetween; and
   the second optical coupler port coupling out of said ring a fraction of optical power of said plurality of filtered optical signals circulating in a first direction on said ring.

2. The Raman laser of claim 1, further comprising an optical isolator disposed in said ring the optical isolator suppressing optical power circulating a second direction opposite said first direction on said ring.

3. The Raman laser of claim 1, further comprising an optical frequency shifter disposed in said ring.

4. The Raman laser of claim 3, wherein said frequency shifter shifts frequency by a wavelength change equal to said common fixed spacing of said periodic filter.

5. The Raman laser of claim 3, wherein said frequency shifter comprises an acousto-optical filter.

6. The Raman laser of claim 1, further comprising a bandpass filter disposed in said ring with a passband including said plurality of signal wavelengths.

7. The Raman laser of claim 6, wherein a wavelength of said optical pump power falls outside of said passband.

8. The Raman laser of claim 6, further comprising:
    an optical isolator disposed in said ring, the optical isolator suppressing optical power circulating in a second direction opposite said first direction on said ring; and
    an optical frequency shifter disposed in said ring.

9. The Raman laser of claim 1, further comprising a fiber Bragg grating disposed in said ring in said first direction away from said Raman fiber.

10. The Raman laser of claim 1, wherein the Raman fiber comprises a Raman optical having:
    a Raman optical fiber coil conveying said optical pump power to said first optical coupler port; and
    a Bragg reflector written into said Raman optical fiber coil to reflect light at the pumping wavelength of said optical pump power.

11. The Raman laser of claim 1, further comprising:
    an external optical fiber conveying said fraction of optical power from said second optical coupler port; and
    a Bragg reflector written into said external optical fiber to reflect light at the pumping wavelength of said optical pump power.

12. The Raman laser of claim 1, wherein said first and second optical coupler ports comprises a wavelength division multiplexer preferentially coupling out of said ring radiation of a wavelength of said optical pump power relative to radiation of said signal wavelengths.

13. The Raman laser of claim 12, further comprising an external optical fiber receiving said fraction of optical power from said wavelength division multiplexer and having a Bragg grating written on the external optical fiber reflective at said wavelength of said optical pump power.

14. The Raman laser of claim 1,
    wherein said first and second optical coupler ports together comprise a first optical fiber partially fused along a length of a second optical fiber forming part of said ring, and
    wherein said optical pump power is conveyed to said ring on a first end of said first optical fiber and said fraction of optical power is conveyed away from said ring on a second end of said first optical fiber.

15. The Raman laser of claim 14, wherein said length is chosen to produce a transmission spectrum of radiation between said first and second optical fibers that is greater at a wavelength of said optical pump power than at said plurality of signal wavelengths.

16. The Raman laser of claim 1, wherein said fixed spacings are a common fixed spacing.

17. A multi-wavelength Raman laser, comprising:
    an optical ring laser loop having a single mode optical fiber with its two ends coupled nearby in an optical fiber ring;
    a Raman optical fiber coil disposed in the optical loop, the Raman optical fiber having multiple modes over a pump wavelength to a plurality of signal wavelengths;
    a frequency shifter disposed in said optical loop and shifting optical radiation by a frequency shift;
    a source of optical pump power having the pump wavelength for pumping the Raman optical fiber at the pump wavelength to obtain a plurality of optical signals, wherein gain is provided by Raman amplification over at least one Stokes order corresponding to the pump wavelength in response to a Raman interaction of the optical pump power and a phonon spectrum of the Raman optical fiber such that said Raman optical fiber transfers optical power between an optical signal at said pump wavelength and the plurality of optical signals at least approximately at the at least one Stokes order including a plurality of signal wavelengths;
    a periodic filter disposed in said optical loop, the periodic filter having a filter spectrum placed approximately at the at least one Stokes order, the filter spectrum including the plurality of signal wavelength having pass bands separated by a fixed wavelength spacing, the periodic filter filtering the plurality of optical signals to filter out a plurality of filtered optical signals having the plurality of signal wavelengths with fixed spacings therebetween and selectively passing a plurality of signal wavelengths separated by a fixed spacing to provide a multi-wavelength signal; and
    a wavelength division multiplexer disposed between the two ends of the optical fiber ring in said optical loop, the multiplexer coupling a first optical fiber to a second optical fiber included in said loop, the multiplexer having a transmission coefficient between said first and second optical fibers that is greater for said pump wavelength than for said signal wavelengths, said optical pump power being coupled into said loop through a first end of said first optical fiber for receiving the source of optical pump power and the multi-wavelength signal being coupled out of said loop through a second end of said first optical fiber.

18. A multi-wavelength Raman laser test signal source, comprising:
    an optical ring laser loop having a single mode optical fiber with its two ends coupled nearby in an optical fiber ring;
    a Raman optical disposed in the optical loop, the having a Raman optical fiber coil having multiple modes over a pump wavelength to a plurality of signal wavelengths and a source of optical pump power having the pump wavelength for pumping the Raman optical fiber coil at the pump wavelength to obtain a plurality of optical signals, wherein gain is provided by Raman amplification over at least one Stokes order corresponding to the pump wavelength in response to Raman interaction of the optical pump power and a phonon spectrum of the Raman optical fiber coil such that the Raman optical fiber coil transfers optical power between an optical signal at said pump wavelength and the plurality of optical signals at least approximately at the at least one Stokes order including a plurality of signal wavelengths;
    a frequency shifter disposed in said optical loop and shifting optical radiation by a frequency shift for reducing mode competition to allow for broad band lasing;

a periodic filter disposed in said optical loop, the periodic filter having a filter spectrum placed approximately at the at least one Stokes order, the filter spectrum including the plurality of signal wavelength having pass bands separated by a fixed wavelength spacing, the periodic filter filtering the plurality of optical signals to filter out a plurality of filtered optical signals having the plurality of signal wavelengths with fixed spacings therebetween and selectively passing a plurality of signal wavelengths separated by a fixed spacing to provide a multi-wavelength signal; and a coupler disposed between the two ends of the optical fiber ring in said optical loop, the coupler coupling out of the loop a fraction of optical power of the multi-wavelength signal.

19. The Raman laser of claim 1, wherein the optical ring fiber comprises a single-mode silica fiber.

20. The Raman laser of claim 1, wherein the optical ring fiber comprises a length of Raman fiber.

* * * * *

UNITED STATES PATENT AND TRADEMARK OFFICE
CERTIFICATE OF CORRECTION

PATENT NO. : 6,674,773 B1  Page 1 of 1
DATED : January 6, 2004
INVENTOR(S) : Jean-Charles JC Cotteverte et al.

It is certified that error appears in the above-identified patent and that said Letters Patent is hereby corrected as shown below:

<u>Column 8,</u>
Line 49, insert the word -- amplifier -- before "having a Raman optical fiber coil"

Signed and Sealed this

Thirteenth Day of April, 2004

JON W. DUDAS
*Acting Director of the United States Patent and Trademark Office*